Oct. 19, 1943.　　　E. W. DAVIS　　　2,332,305
LUBRICATING APPARATUS
Filed Nov. 13, 1939　　　2 Sheets-Sheet 1
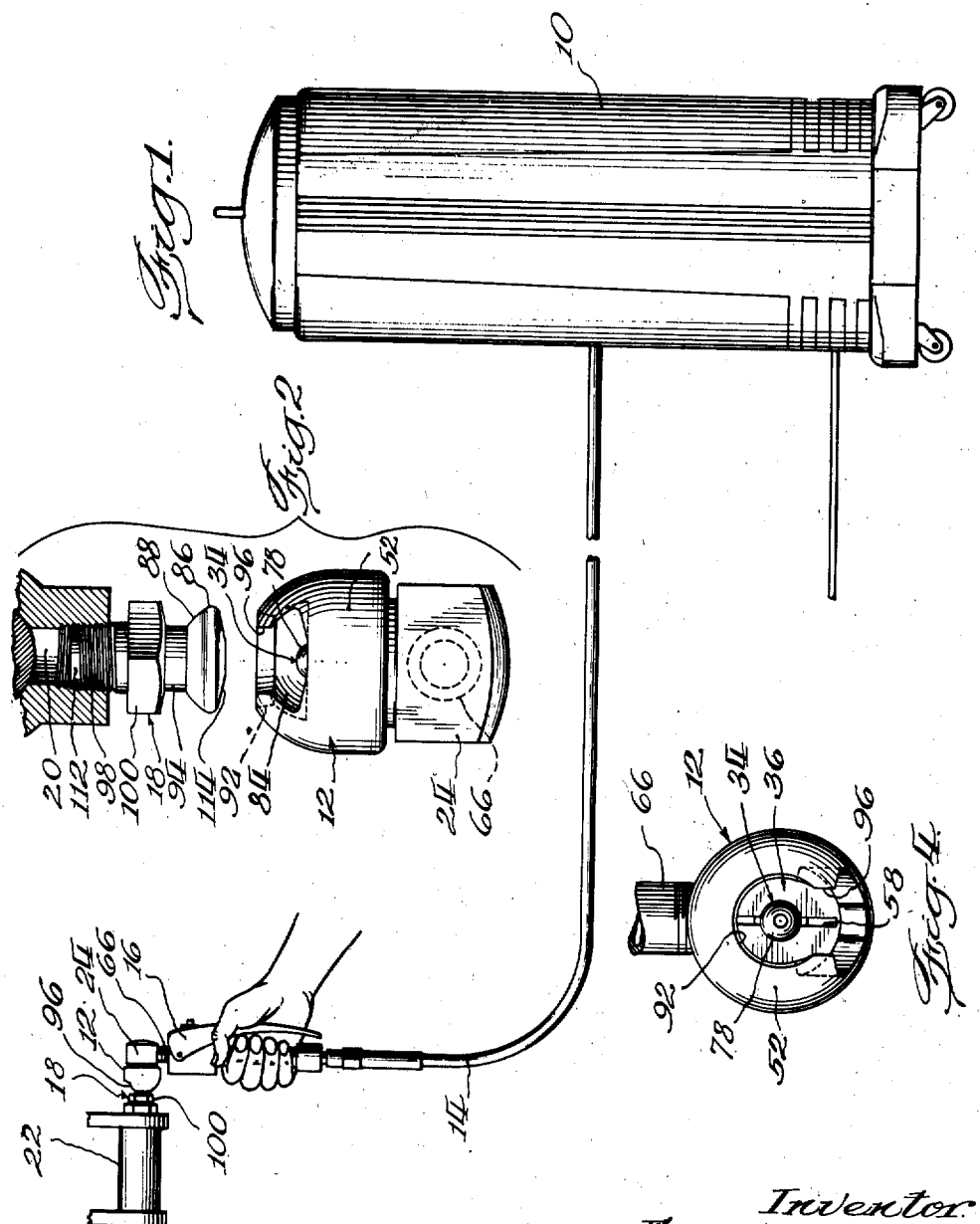
Inventor
Ernest W. Davis
By Williams, Bradbury,
McCaleb & Hinkle
Attys.

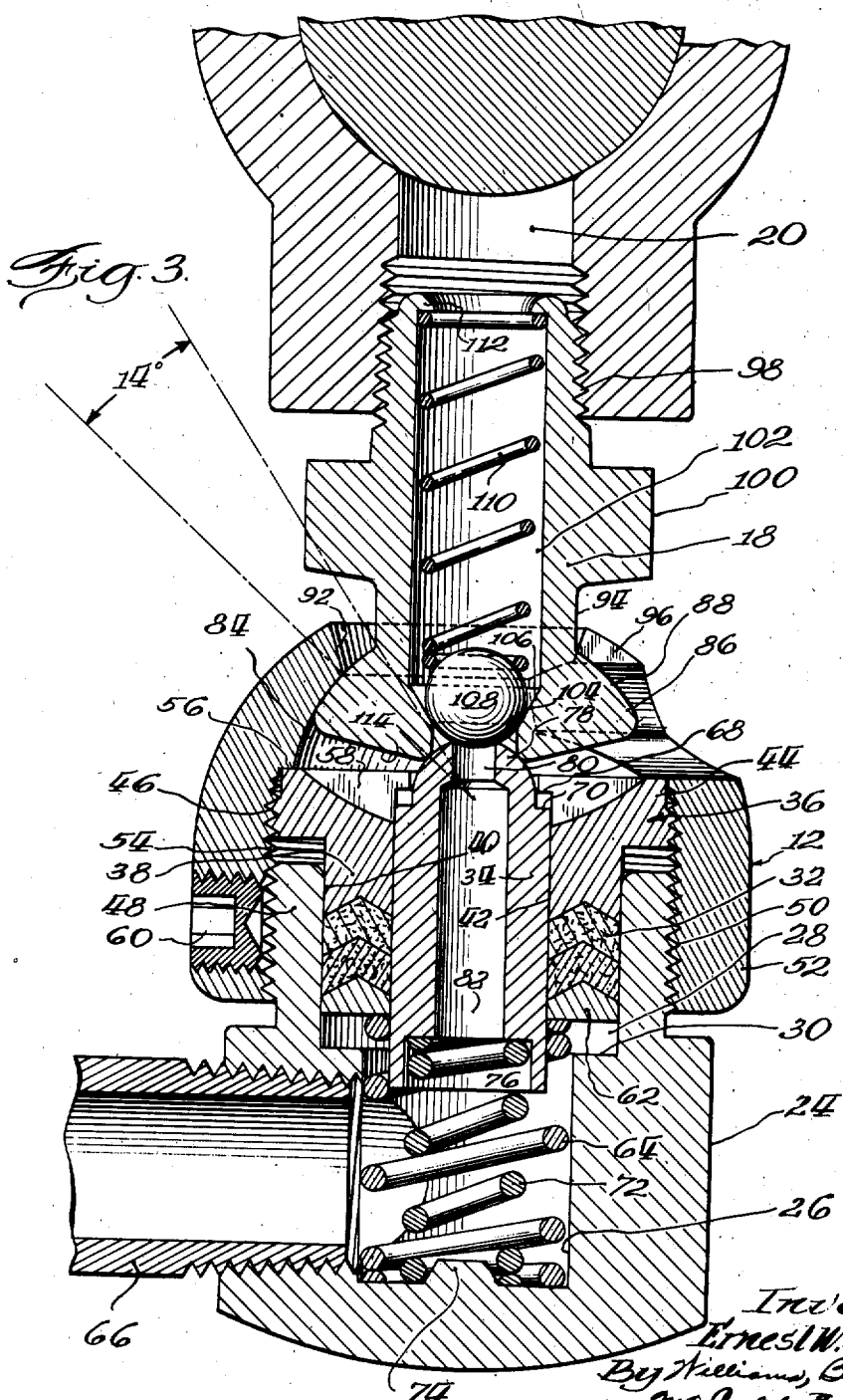

Patented Oct. 19, 1943

2,332,305

UNITED STATES PATENT OFFICE 2,332,305

LUBRICATING APPARATUS

Ernest W. Davis, Oak Park, Ill., assignor to Stewart-Warner Corporation, Chicago, Ill., a corporation of Virginia Application November 13, 1939, Serial No. 303,980

10 Claims. (Cl. 285—143)

This invention relates to improvements in lubricating apparatus, and more particularly to lubricant receiving fittings and to lubricant couplers for use therewith.

An object of the invention is to provide a novel clamp-type coupler and a novel grease receiving fitting for engagement thereby throughout a wide range of angular relationships.

An additional object is to provide novel co-operating fittings and couplers such that the coupler may readily be attached to any of the fittings and moved throughout a wide range of angular relationships in any direction, meanwhile maintaining a perfect grease seal between the coupler and fitting.

A further object is to provide a novel coupler and cooperating fitting which accomplish the above objectives, and which may be manufactured relatively inexpensively.

Another object is to provide a novel lubricating apparatus permitting universal relative movement between the coupler and fitting, and in which the coupler and fitting are clamped together by the fluid pressure of the lubricant.

An additional object is to provide a coupler and fitting having the above advantages, and wherein the novel arrangement of parts enables a shorter fitting to be used.

Other objects and advantages will become apparent from the following description and attached drawings, wherein:

Fig. 1 is a somewhat diagrammatic representation of the lubricating apparatus in use for lubricating a bearing;

Fig. 2 is an end view of the coupler and a side view of the fitting for use therewith;

Fig. 3 is a vertical medial sectional view of the coupler and fitting shown with the coupler attached to the fitting; and Fig. 4 is a plan view of the coupler cap.

In the drawings, in which like indicia refer to like parts throughout the several views, the lubricating apparatus comprises generally a lubricant reservoir and compressor 10, which may be of any well-known and suitable type, connected to a coupler 12 by a hose 14 and control valve 16. A grease receiving fitting 18, threaded in a grease hole 20 leading to each of the bearings to be lubricated, such, for instance, as an automobile spring shackle 22, co-operates with the coupler to form a quickly detachable connection by means of which lubricant is forced from the coupler 12 to the bearing.

The coupler 12 has a generally cylindrical body portion 24 which, when in the position shown in Fig. 3, is provided with an upwardly opening cylindrical recess 26 extending almost the length of the body. The upper portion of this recess 26 is counterbored to form a second cylindrical recess 28 of greater diameter and separated from the lower portion by the annular shoulder 30. The upper recess 28 provides a space within which is positioned a packing gland 32 surrounding a hollow piston 34.

A packing nut 36, which comprises a portion of the packing gland 32, is provided with an annular cylindrical portion 38. This portion 38 is adapted to slide vertically with its external surface 40 in close contact with the inner cylindrical surface of the recess 28 and with its internal bore 42 slidably fitted around the hollow piston 34. The top end 44 of the packing nut 36 is of greater diameter than the cylindrical portion 38 and is provided with external threads 46.

The top portion 48 of the body 24 is of reduced section and has threads 50 of the same pitch diameter and of the same pitch as the nut 36.

A generally hemispherical hollow cap 52 is internally threaded at 54 to fit the threads 46 and 50 of the packing nut 36 and body 24. Thus, the packing nut 36 may be threaded into the cap 52 and screwed tightly in place against a shoulder 56, by means of a screwdriver or similar tool, extending into a kerf 58 in the top surface of the packing nut. The cap 52 may then be threaded to the body 24, thereby forcing the annular portion 38 of the packing nut downwardly inside the recess 28 and around the movable piston 34.

When the cap 52 has been sufficiently threaded to the body 24, relative movement between these parts is prevented by tightening a safety head set screw 60, threaded radially through the lower portion of the cap 52.

Beneath the annular portion 38 of the packing nut 36, the recess 28 contains a quantity of packing material 32 supported upon an annular ring 62. This annular ring 62 is maintained resiliently in place by a coil spring 64, which extends around the lower end of the piston 34 and is compressed with its ends respectively against the lower surface of the ring 62 and the lower end of the recess 26.

Lubricant enters the coupler 12 from the valve 16 through a pipe nipple 66, which is threaded radially into the recess 26 through the lower portion of the body 24. This lubricant, during a lubricating operation, will bear against the lower surface of the annular packing ring 62, and by its hydraulic pressure aids in urging the ring upwardly to compress the packing 32. Thus, the packing 32 is compressed to a greater extent during the actual lubricating operation than when the coupler is disjoined from a fitting.

A shoulder 68 at the top of the central opening 42 in the packing nut 36 co-operates with a complementary shoulder 70 on the movable piston 34 to limit outward movement of the piston. Normally, when the coupler is disjoined from the fitting, the piston 34 will be urged outwardly against the shoulder 68 by a coil spring 72 compressed between the lower end of the piston and the bottom of the recess 26. To keep this spring 72 concentric with respect to the piston and the packing spring 64, the lower end of the spring 72 fits around a boss 74 at the bottom of the recess 26, while the upper end fits within a counterbored spring seat 76 located in the lower end of the piston 34.

It will be seen that during a lubricating operation, the hydraulic pressure of the lubricant in the recess 26 will aid the spring 72 in urging the piston 34 outwardly.

The outward end, or nose 78 of the piston 34 is hemispherical and projects somewhat beyond the upper surface of the packing nut 36. This nose 78 serves to seal the coupler to the fitting 18 during a lubricating operation. The nose of the piston 34 is provided with a grease orifice 80 leading to a counterbored hole 82 extending axially through the piston to the recess 26. During a lubricating operation, the lubricant therefore flows from the recess 26 to the fitting by way of the hole 82 and orifice 80.

The interior surface configuration of the portion of the cap 52 above the packing nut 36 is that of a spherical segment and serves as a socket 84 for forming a swivel connection with a shoulder 86 of a head 88 of the fitting 18.

To permit the head 88 to extend inside the coupler, the cap 52 is provided with a frustoconical hole 92 extending through the outward end of the cap and axially aligned with the piston 34. This hole 92 is of such a size that when the coupler is joined to the fitting, as shown in Fig. 3, for instance, the coupler may be tilted in any direction to a considerable extent before a portion of the side wall of the hole 92 is brought against a neck portion 94 of the fitting. In the embodiment shown, as may be seen from Fig. 3, this angular displacement of the coupler relative to the fitting may be as much as approximately fourteen degrees in any direction.

In order to enable the coupler to be joined to the fitting, a slot 96 extends through the domed portion of the cap and joins the axial hole 92. As may be seen in Fig. 3, this slot has a configuration complementary to the profile of the head and neck of the fitting, and thus permits a longitudinal movement of the coupler in a direction normal to the axis of the hole 92, to slip the cap of the coupler over the head of the fitting and to bring the cap and coupler into the relationship shown in Figs. 1 and 3.

The fitting 18, which co-operates with the above-mentioned coupler, comprises a sleeve having a threaded portion 98 at one end to be secured in a grease hole and a head 88 at the opposite end for engagement by the coupler. Between the ends, a portion of the fitting preferably has a hexagonal section 100 for engagement by a wrench for inserting or removing the fitting. A hole 102 extends axially into the fitting from the threaded end and is joined near the head of the fitting by a smaller orifice 104 through which grease is forced into the fitting. At the juncture of the hole 102 and orifice 104 a frustoconical seat 106 is formed against which a ball check valve 108 is urged by a coil spring 110. The opposite end of this coil spring 110 is supported by an inwardly rolled shoulder 112 formed at the outlet end of the fitting.

The head 88 of the fitting is supported upon the neck 94, which, as has been previously stated, is somewhat smaller in diameter than the hole 92 in the end of the coupler cap 52. The end of face 114 of the head 88 is a frustum of a cone, the altitude of which is quite small in comparison to its base diameter. That is, this face 114 may be considered as a plane surface that has been modified sufficiently so that as the coupler is swiveled about the fitting, no portion of this end face will come into contact with the upper face of the packing nut 36, while the portion of the face surrounding the orifice 104 will at all times be spaced only a slight distance from this packing nut 44.

The shoulder 86 of the fitting is complementary to the spherical surface 84 of the cap 52, and since this shoulder is symmetrical with the orifice 104, the center of this orifice will always remain in one position relative to the coupler so long as the shoulder 86 remains against the spherical surface 84.

With the coupler slipped over the fitting head, as shown in Fig. 3, the spherical nose 78 of the piston 34 is urged outwardly and centers itself within the orifice 104 and effectively seals the joint between these two parts. In order that this seal be effective within the complete range of possible angular relationships of the coupler relative to the fitting, the center of curvature of the spherical surface 84 should coincide with the center of curvature of the spherical nose 78 when this nose is centered within the orifice 104. It should be noted also that the orifice 80 in the nose of the piston should be considerably smaller than the orifice 104 in the fitting, as otherwise an effective seal would not be maintained excepting throughout a comparatively narrow range of angular relationships between the coupler and fitting.

In operation, the fittings will be threaded into grease holes leading to portions of the automobile or other machine to be lubricated. The cap of the coupler is then slipped over one of the fittings until the nose 78 of the piston snaps into the orifice 104. In this position the coupler may be tilted in any direction, or it may be turned around the fitting throughout a complete circle. The valve 16 is then opened to allow lubricant under pressure to be forced through the coupler and fitting into the part to be lubricated. The hydraulic pressure produced by the lubricant in the chamber formed by the recess 26 forces the packing 32 more tightly around the piston 34, and presses the nose 78 of the piston more tightly into the orifice 104. A tight grease seal is thereby maintained throughout the lubricating operation.

At the end of the lubricating operation, the valve 16 is closed, thereby allowing the pressure in the recess 26 to drop and the coupler to be pulled free of the fitting.

Having described my invention and illustrated a preferred embodiment thereof, what I claim as new and useful and desire to secure by Letters Patent of the United States is:

1. A lubricating device comprising a headed lubricant receiving fitting having an orifice at its outward end, a spherical shoulder concentric with said orifice, a coupler having a spherical surface complementary to said spherical shoulder, and a movable piston in said coupler having a spherical nose to seat in said orifice, said piston having a grease hole through said nose, said nose, when seated in said orifice, having a center of curvature substantially common with said spherical surface.

2. For use with a headed fitting having a lubricant receiving orifice and a spherical shoulder concentric with the orifice; a coupler having a spherical socket complementary to said spherical shoulder, a piston having a spherical nose at one end and adapted to move longitudinally in said coupler to seat said nose in said orifice, and the center of curvature of said socket being substantially common with the center of curvature of said nose when said nose is seated in said orifice.

3. A lubricating device comprising a headed lubricant receiving fitting having an orifice at its outward end, a spherical shoulder concentric with said orifice, a coupler having a spherical surface complementary to said spherical shoulder, a movable piston in said coupler, a spherical nose on said piston to seat in said orifice, said piston having a grease hole through said nose, said nose, when seated in said orifice, having a center of curvature substantially common with said spherical surface, and the diameter of the grease hole being substantially less than the diameter of said orifice.

4. A lubricating device comprising a headed lubricant receiving fitting having an orifice at its outward end, a spherical shoulder concentric with said orifice and the center of curvature of said spherical shoulder being located beyond the outward end of said fitting, a coupler having a spherical socket complementary to said spherical shoulder, a movable piston in said coupler, and a spherical nose on said piston to seat in said orifice, said piston having a grease hole through said nose, said nose, when seated in said orifice, having a center of curvature substantially common with said spherical socket.

5. A lubricating device comprising a headed lubricant reeciving fitting having an orifice at its outward end, a spherical shoulder concentric with said orifice and the center of curvature of said spherical shoulder being located beyond the outward end of said fitting, a coupler having a spherical socket complementary to said spherical shoulder, a movable piston in said coupler, a spherical nose on said piston to seat in said orifice, said piston having a grease hole through said nose, said nose, when seated in said orifice, having a center of curvature common with said spherical shoulder, and the diameter of the grease hole being substantially less than the diameter of said orifice.

6. For use with a headed fitting having a lubricant receiving orifice and a spherical shoulder concentric with the orifice; a coupler comprising a body portion having a spherical socket therein complementary to said spherical shoulder, a piston having a spherical nose at one end and adapted to move longitudinally in said body portion to seat said nose in said orifice, the center of curvature of said socket being substantially common with the center of curvature of said nose when said nose is seated in said orifice and said common center of curvature being within the coupler body portion.

7. For use with a headed fitting having a lubricant receiving orifice and a spherical shoulder concentric with the orifice; a coupler comprising a body portion having a spherical socket therein complementary to said spherical shoulder, a piston having a spherical nose at one end and adapted to move longitudinally in said body portion to seat said nose in said orifice, the center of curvature of said socket being substantially common with the center of curvature of said nose when said nose is seated in said orifice, and hydraulic means actuated during a lubricating operation to force said nose tightly into said orifice.

8. For use with a headed fitting having a lubricant receiving orifice and a spherical shoulder concentric with the orifice; a coupler comprising a body portion having a spherical socket therein complementary to said spherical shoulder, a piston having a spherical nose at one end and adapted to move longitudinally in said body portion to seat said nose in said orifice, the center of curvature of said socket being substantially common with the center of curvature of said nose when said nose is seated in said orifice, said common center of curvature being within the coupler body portion, and hydraulic means actuated during a lubricating operation to force said nose tightly into said orifice.

9. For use with a headed fitting having a lubricant receiving orifice and a spherical shoulder concentric with the orifice; a coupler comprising a body portion having a spherical socket therein complementary to said spherical shoulder, a piston having a spherical nose at one end and adapted to move longitudinally in said body portion to seat said nose in said orifice, the center of curvature of said socket being substantially common with the center of curvature of said nose when said nose is seated in said orifice, said coupler having a slot opening into the side of the socket, and said slot having a form substantially complementary to the profile of the outer portion of the headed fitting.

10. For use with a headed fitting having a lubricant receiving orifice and a spherical shoulder concentric with the orifice; a coupler having a spherical socket complementary to said spherical shoulder, a piston having a spherical nose at one end and adapted to move longitudinally in said coupler to seat said nose in said orifice, and the center of curvature of said socket being substantially common with the center of curvature of said nose when said nose is seated in said orifice, said coupler having a slot opening into the side of the socket, said slot having a form substantially complementary to the profile of the outer portion of the headed fitting, and hydraulic means actuated during a lubricating operation to force said nose tightly into said orifice.

ERNEST W. DAVIS.